United States Patent [19]

Leigh-Monstevens et al.

[11] Patent Number: 4,914,916
[45] Date of Patent: Apr. 10, 1990

[54] TANDEM MASTER CYLINDER WITH ELECTROMAGNETIC POSITION SENSORS FOR EACH PISTON

[75] Inventors: Keith V. Leigh-Monstevens, Troy; Brian D. Mabee, Warren, both of Mich.

[73] Assignee: Automotive Products plc, Warwickshire, England

[21] Appl. No.: 177,312

[22] Filed: Apr. 4, 1988

[51] Int. Cl.⁴ ............................................. B60T 17/22
[52] U.S. Cl. ......................................... 60/534; 60/535; 60/562; 92/5 R; 324/207.20
[58] Field of Search ................. 60/534, 535, 538, 545, 60/562, 582; 303/84.2; 91/1; 200/82 D; 338/32 H; 324/208, 251, 235; 92/5 R

[56] References Cited

U.S. PATENT DOCUMENTS

| | | | |
|---|---|---|---|
| 3,112,464 | 11/1963 | Ratajski et al. | 338/32 H |
| 3,411,133 | 11/1968 | Gardner | 200/82 D |
| 3,412,557 | 11/1968 | Williams | 60/535 |
| 3,448,579 | 6/1969 | Reznicek | 60/535 |
| 3,529,171 | 9/1970 | Hultgren et al. | 200/82 D |
| 3,635,024 | 1/1972 | Graham | 60/535 |
| 3,686,864 | 8/1972 | Shutt | 60/535 |
| 4,143,514 | 3/1979 | Leiber | 60/545 X |
| 4,176,586 | 12/1979 | Stoll et al. | 92/5 R |
| 4,526,003 | 7/1985 | Leiber | 60/538 X |
| 4,776,643 | 10/1988 | Leiber | 60/535 X |

FOREIGN PATENT DOCUMENTS

| | | | |
|---|---|---|---|
| 2059592 | 11/1979 | Fed. Rep. of Germany | 92/5 R |
| 2915198 | 10/1980 | Fed. Rep. of Germany | 92/5 R |
| 42136 | 12/1971 | Japan | 324/208 |
| 50554 | 12/1972 | Japan | 60/534 |
| 50555 | 12/1972 | Japan | 60/534 |
| 72771 | 4/1983 | Japan | 92/5 R |
| 1143056 | 2/1969 | United Kingdom . | |
| 1234912 | 6/1971 | United Kingdom . | |
| 1555074 | 11/1979 | United Kingdom . | |
| 2106651 | 4/1983 | United Kingdom | 324/208 |
| 2111622 | 6/1983 | United Kingdom . | |
| 2168444 | 6/1986 | United Kingdom . | |

Primary Examiner—Robert E. Garrett
Assistant Examiner—George Kapsalas
Attorney, Agent, or Firm—Krass and Young

[57] ABSTRACT

A brake failure warning system for a dual hydraulic master cylinder for use with a motor vehicle. The warning system employs a pair of Hall Effect magnetic sensors which are positioned on the exterior of a plastic cylinder in association with the two pistons mounted within the bore of the cylinder. The pistons have ferrous frustoconical portions which coact with the respective sensors to generate position signals that vary as the pistons move in the bore past the respective sensors. The two position signals are fed to a logic board which compares the signals and generates an error or warning signal in the event that the difference between the two signals exceeds a predetermined amount indicative of failure of one of the two braking systems of the vehicle.

19 Claims, 3 Drawing Sheets

TANDEM MASTER CYLINDER WITH ELECTROMAGNETIC POSITION SENSORS FOR EACH PISTON

BACKGROUND OF THE INVENTION

This invention relates to master cylinder assemblies and more particularly to dual master cylinder assemblies suitable for use, for example, in motor vehicle braking systems.

It has become common practice in recent years for motor vehicles to employ braking systems in which two of the wheels are on one braking circuit and the other two wheels are on a second braking circuit so that failure of one circuit will not totally destroy the braking capacity of the vehicle. This dual circuit arrangement has necessitated master cylinders employing two separate pistons which separately provide pressurized fluid to the two circuits of the vehicle braking system. It is also common practice to provide some means for determining when a failure has occurred in either braking circuit and apprising the vehicle operator of such failure. In one popular prior art warning system, a shuttle member is placed in communication at its opposite ends with the two pressure chambers associated with the two pistons of the master cylinder so that the shuttle member is moved axially in response to a significant difference in the pressures in the two pressure chambers and this movement of the shuttle member is sensed to provide a warning signal indicating that one of the brake circuits has failed. Whereas this prior art warning system has been generally satisfactory in the sense of providing a warning of brake system failure, the system requires violation of the bore of the cylinder with the consequent creation of fluid leakage paths in the master cylinder assembly; the system requires seals so that the hydraulic pressure fluid employed to move the shuttle member does not escape from the system; the system requires an expensive failure switch to sense the movement of the shuttle member; and the system requires several intricate machining operations with respect to the associated master cylinder assembly to provide the required structure and fluid paths for the warning system.

SUMMARY OF THE INVENTION

This invention is directed to the provision of an improved dual master cylinder assembly, and more particularly to the provision of a brake dual master cylinder assembly employing improved means for warning of a failure of one of the braking circuits.

More specifically, this invention is directed to the provision of a failure warning system for a brake dual master cylinder assembly which is inexpensive, reliable in operation, and which does not violate the high pressure fluid bore of the master cylinder.

The invention applies to a master cylinder assembly of the type including a cylinder defining an axial bore; first and second pistons mounted for stroking reciprocal joint axial movement in the bore and coacting with the cylinder to define first and second pressure chambers in the cylinder; and first and second discharge ports in the cylinder communicating respectively with the first and second pressure chambers so that pressurized fluid is discharged through the first and second discharge ports in response to stroking axial movement of the pistons in the bore. According to the invention, sensing means are provided which individually sense the linear position of each of the pistons as the pistons move axially in the bore. When applied to a brake dual master cylinder system, the sensing means operates in response to a predetermined sensed differential movement between the pistons as the pistons move in the bore to generate a warning signal. This arrangement, whereby the pistons are individually tracked and their differential movement noted, provides an early and accurate means of sensing failure in one or both of the braking circuits.

According to a further feature of the invention, the cylinder is formed of a non-ferrous material; the pistons each include a portion formed of a ferrous material; and the sensing means includes a magnetic sensor associated with each piston. This arrangement allows the individual movements of the individual pistons to be constantly monitored without violating the bore of the cylinder.

According to a further feature of the invention, the magnetic sensors comprise Hall Effect sensors. This arrangement provides a ready and efficient means of generating an output signal proportioned to the positions of the pistons in the cylinder bore.

According to a further feature of the invention, the magnetic sensors are mounted on the cylinder in spaced relation with each sensor adjacent the ferrous portion of the respective piston, and the ferrous portion has a cross-sectional configuration that varies along the axis of the ferrous portion so that the signal generated by the respective sensor varies as the respective piston moves axially in the bore. This arrangement allows the sensors to generate signals that are proportioned to and correspond to the precise axial position of the pistons in the cylinder bore.

According to a further feature of the invention, the ferrous portion of each piston has a frustoconical configuration. This arrangement allows the sensed surface of the piston to move proportionally further toward or away from the magnetic sensor as the piston moves axially in the bore so as to generate a signal that accurately represents the axial position of the piston in the bore.

According to a further feature of the invention, the sensing means includes a first comparator receiving the output signal from the first and second sensors and operative to generate an output signal including an error signal representing any variation between the sensor output signals. This arrangement allows a warning signal to be generated in response to a predetermined magnitude of differential piston movement.

According to a further feature of the invention, the sensing means further includes a second comparator receiving the output signal from the first comparator and operative to generate a warning output signal when the recieved signal exceeds a predetermined maximum threshold signal level and a third comparator receiving the output signal from the first comparator and operative to generate a warning output signal when the received signal is less than a predetermined minimum threshold signal level. This arrangement provides a convenient and inexpensive means of filtering out extraneous, insignificant differential movements between the pistons while recognizing differential movements that are representative of brake system failure.

In the disclosed embodiments of the invention, the magnetic sensors are mounted on the cylinder exteriorly of the cylinder bore and proximate the ferrous portions of the piston and operate to establish a conical magnetic field extending through the non-ferrous material of the cylinder and into the bore of the cylinder for coaction with the varying cross-sectional configuaration of the ferrous portions of the pistons to generate position signals that vary with variations in the axial positions of the ferrous portions of the pistons in the bore. Control logic means are provided which receive the position signals from the sensors and operate in response to a predetermined difference in the position signals to generate a warning signal indicating excessive relative movement between the first and second pistons.

DETAILED DESCRIPTION OF THE PREFERRED EMBODIMENT

Figure 1:
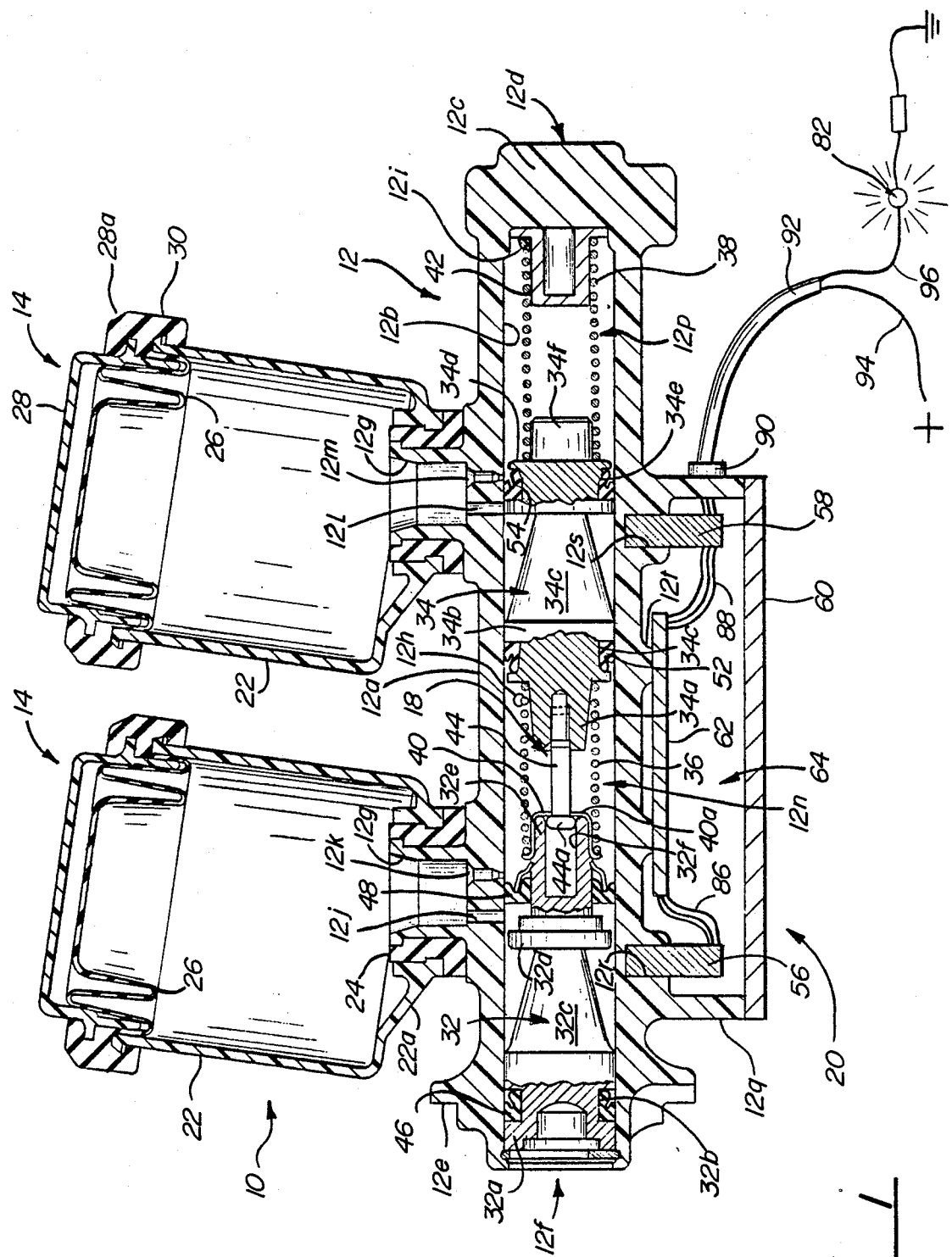
FIG. 1 is a cross-sectional view of a dual master cylinder assembly according to the invention.

The dual master cylinder assembly seen generally at 10 in FIG. 1 is intended for use in a hydraulic braking system for a motor vehicle and includes a cylinder 12, a pair of reservoir assemblies 14, a piston assembly 18, and sensing means 20.

Cylinder 10 is formed of a suitable non-ferrous material such, for example, as aluminum or plastic and includes a main body portion 12a defining an axially extending central bore 12b, a mounting flange portion 12e adjacent an open rearward end 12f, a pair of axially spaced reservoir fittings 12g, a first discharge port 12h, and a second discharge port 12i.

Each reservoir assembly 14 includes a main body container member 22 including a lower neck portion 22a secured to a respective reservoir fitting 12g by an elastomeric member 24, a diaphragm 26 of bellows configuration, a cover member 28, and an annular elastomeric member 30 surrounding the upper end of container 22 and receiving a lip portion 28a of cover member 28.

Piston assembly 18 includes a first, rearward piston 32; a second, forward piston 34; a first spring 36; and a second spring 38.

Rearward piston 32 is formed of steel and includes a rearward annular land portion 32a of generally cylindrical construction and defining a seal groove 32b, an intermediate portion 32c of frustoconical configuration tapering radially inwardly toward the forward end of the piston, a forward generally cylindrical land portion 32d, and a forward nose portion 32e.

Forward piston 34 includes a rearward nose portion 34a, a rearward land portion 34b defining an annular seal 34c, an intermediate portion 34d of frustoconical configuration tapering radially inwardly toward the forward end of the piston; a forward land portion 34d defining a seal groove 34e, and a forward nose portion 34f.

Spring 36 is positioned at its rearward end over nose portion 32e piston 32 in engagement with a spring retainer 40 seated on nose portion 32e and is seated at its forward end on nose portion 34a of piston 34. Spring 38 is seated at its rearward end on nose portion 34f of piston 34 and is seated at its forward end around a spring retainer 42 positioned against the forward end wall 12c of the cylinder. Springs 36 and 38 normally function to maintain the pistons in the position shown in FIG. 1 with a valve stem 44 threadably received at its forward end in nose portion 34a of piston 34 and its rearward head portion 44a seated in a bore 32f in piston nose portion 32e and engaging a radial portion 40a of spring retainer 40.

A first annular seal 46 is positioned in seal groove 32b, a second annular seal 48 is positioned on piston nose portion 32e by a clip member 50, a third annular seal 52 is positioned in annular groove 34c, and a fourth annular seal 54 is positioned in annular groove 34e. In the retracted position of the piston assembly as seen in FIG. 1, seal 48 is positioned between a first reservoir port 12j and a second reservoir port 12k and seal 54 is positioned between a first reservoir port 12 and a second reservoir port 12m. It will be understood that piston assembly 18 divides bore 12b into a first, rearward pressure chamber 12n between seals 48 and 52 and a second, forward pressure chamber 12p between seal 54 and cylinder forward end wall 12c. It will be further understood that as the piston assembly is moved rightward in FIG. 1 in response to actuation from an input rod, the seals 48 and 54 immediately move rightward to respectively cover ports 12k and 12m so that, as the pistons continue to move rightward, pressurized fluid is delivered respectively from rearward pressure chamber 12n through discharge port 12h and from forward pressure chamber 12p through discharge port 12i for respective delivery to the two circuits of the associated vehicular braking system with each circuit controlling two wheels of the vehicle in known manner.

Sensing means 20 includes a first, rearward Hall Effect magnetic sensor 56, a second, forward Hall Effect magnetic sensor 58, a cylinder housing portion 12g, a cover 60, and a logic board 62.

Hall Effect sensors 56 and 58 are threaded into blind threaded bores 12r and 12s provided in the wall of main body cylindrical portion 12a respectively adjacent the frustroconical portion 32c of piston 32 and the frustoconical portion 34c of piston 34. Sensors 56, 58 may for example be of the type available from Magnetic Sensor Corporation of Anaheim, California as Part Number 141-001.

Housing portion 12g is formed as an integral portion of cylinder 12, provides a closed loop wall around sensors 56, 58, and coacts with cover 60 to define a sensor chamber 64.

Logic board 62 is suitable positioned within chamber 64 by suitable securement to lugs 12t on the exterior periphery of cylinder main body 12a.

Figure 2:
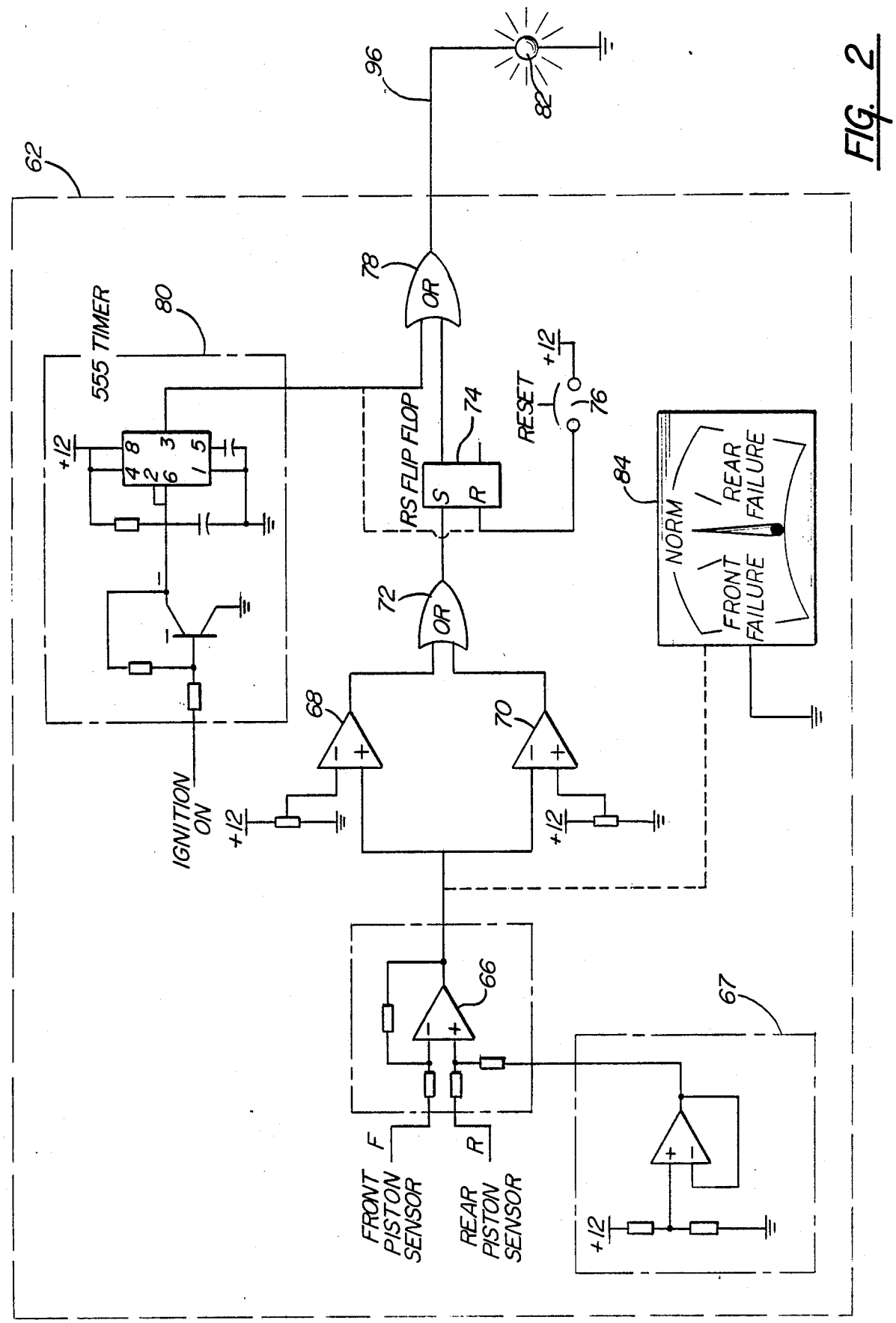
FIG. 2 is a diagrammatic view showing a control logic for use with the master cylinder assembly of FIG. 1.

The circuitry of logic board 62 is shown in FIG. 2. The logic of FIG. 2 includes a comparator 66 receiving a signal F from forward sensor 58 and a signal R from rearward sensor 56. Comparator 66 further receives a DC offset signal from a DC offset unit 67. This DC offset voltage is typically one-half the supply voltage, or approximately six volts. Comparator 66 generates an output signal equal to the difference between R and F plus the DC offset voltage. This output signal from comparator 66 is then fed into the positive terminal of a comparator 68 and into the negative terminal of a comparator 70. Comparator 68 compares the received signal to a predetermined constant voltage V max equal to approximately sixty percent of the supply voltage, or approximately seven volts. This V max signal is fed to the negative terminal of comparator 66. If the signal received from comparator 66 is greater than V max, the output of comparator 68 goes to the supply voltage. If the signal received from comparator 66 is less than V max, the output of comparator 68 will remain at ground (zero volts).

Comparator 70 functions to compare the received signal from comparator 66 to a predetermined constant voltage V min equal to approximately forty percent of the supply voltage, or approximately five volts. This V min signal is fed to the positive terminal of comparator 70. If the signal received from comparator 66 is less than V min, the output of comparator 70 goes to the supply voltage. If the signal received from comparator 66 is greater than V min, the output of comparator 70 will remain at ground (zero volts). The outputs from comparator 68 and 70 are fed to the input terminals of an OR gate 72. If the output from comparator 68 or the output from comparator 70 are equal to the supply voltage, then the output or OR gate 72 will be equal to the supply voltage. Otherwise, the output will be ground (zero volts).

The output of OR gate 72 is fed into the set (S) terminal of an RS FLIP-FLOP 74. If the voltage at S, at any time, is high (equal to the supply voltage) then the output of the RS FLIP-FLOP will go high and remain high until a reset button 76 is pushed. Reset button 76 may be located, for example, on master cylinder 12. The output from RS FLIP-FLOP 74 is fed to an OR gate 78. A timer signal from a 555 timer 80 is also fed into OR gate 78. This timer signal is high for approximately three seconds after the vehicle ignition is first turned on. After three seconds, the timer signal returns to ground (zero volts). This three second time is given as an example and can be set to any direction. The purpose of the timer is to provide a means of testing the failure warning indicator upon initial system start-up. If the timer output signal is high or the RS FLIP-FLOP signal is high, then the output of OR gate 78 will be high thus causing a failure warning indicator 82 (located for example in the instrument panel of the vehicle) to be activated.

The control logic may also include provisions to reset the system upon system power up. This is accomplished by wiring the output of timer 80 to the reset (R) terminal of the RS FLIP-FLOP 74 so that the system will be reset each time the ignition is turned on. The logic could also include a brake failure meter or gauge which would appear on the instrument panel of the vehicle and would provide a continuous read out on the status of the braking system. This could be accomplished by supplying the output signal from comparator 66 to a voltage controlled gauge 84. If the error signal (R-F) is zero, then the status of the brakes, as shown by the needle of guage 84, would be normal. If R-F was positive, then the rear piston has moved more that the front piston and thus a failure has occurred in the rear of the cylinder. The magnitude of a failure would be proportional to the difference of the two signals (R-F). The same would also be true if R-F were negative. This would indicate that the front piston had moved less than rear piston and thus a failure had occurred in the front of the cylinder assembly. The needle of guage 84 in each case would thus indicate the location and magnitude of the system failure.

Logic board 62 when positioned within chamber 64 is suitably secured to sensor 56 by leads 86 and to sensor 58 by leads 88. Further, a plug 90 may be received in housing wall 12g with suitable connection to sensor 58 and logic board 62. Plug 90 may be associated with a conduit 92 carrying a lead 94 for connection to a 12 volt supply and a lead 96 for connection to the warning light 82. Sensors 56, 58, logic board 62 and the associated leads would normally be potted within chamber 64.

It will be understood that sensors 56 and 58 function to establish conical magnetic fields extending through the non-ferrous material of the associated cylinder 12 and into the cylinder bore for coaction with the varying cross-sectional configurations of the piston portions 32c, 34c to generate position signals that vary with variations in the axial positions of the respective pistons in the cylinder bore. Specifically, with the specific construction of FIG. 1, as the pistons 32 and 34 are moved to the right in response to actuation of the braking system, the distance between the tips of the respective sensors 56, 58 and the nearest wall surface of the frustoconical piston portions 32c, 34c gradually decreases as the pistons move to the right so that the voltage signal generated by the sensors 56, 58 gradually decrease as the pistons move to the right so that the voltage signal generated by the sensors 56, 58 gradually increases as the pistons move to the right. Sensors 56 and 58 thus, by the magnitude of the signal generated, provide an accurate indication of the precise axial position of the pistons 32 and 34 at any given time and these position signals are processed in the manner described with respect to logic board 62 to generate an error signal to actuate warning light 82 in the event that a predetermined magnitude of differential occurs between the movement of the pistons indicative of a failure in one or both of the associated braking circuits.

Specifically, under normal operating conditions, the pistons 32, 34 will move in unison down the bore of the cylinder so that the signal R received by logic 132 will equal the signal F received by the logic board and no error signal will be generated. If, however, rearward piston 32 moves faster than piston 34, the signal R will exceed the signal F and the high threshold comparator 68 will function to generate an output signal to OR gate 72 to actuate the warning light 82. Conversely, if the forward piston 34 moves more rapidly than the rearward piston 32, the position signal F will exceed the position signal R and the low threshold comparator 70 will function to generate an output signal for transmission to the OR gate 72 to actuate the warning light 82.

Figure 3:
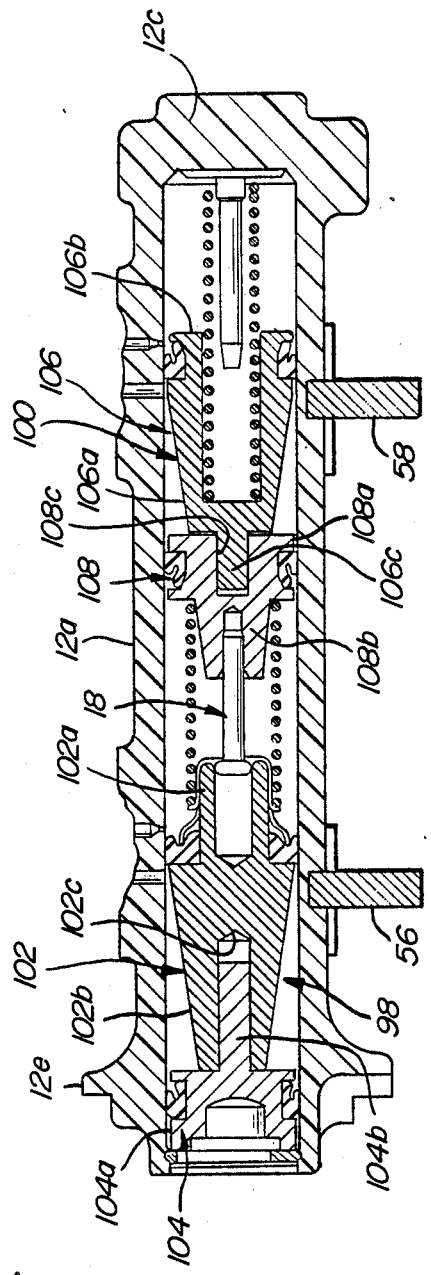
FIG. 3 is a fragmentary view showing a modified form of dual master cylinder assembly according to the invention.

A modified form of construction of the piston assembly 18 is illustrated in FIG. 3. Specifically, in the piston assembly 18 of FIG. 3, each of the pistons 98 and 100 has a composite construction including a first ferrous part and a second non-ferrous part. For example, rear piston 98 may include a forward member 102 formed of steel and a rearward member 104 formed of aluminum. Forward steel member 102 includes a forward nose portion 102a and a rearward fustoconical portion 102b defining a rearwardly opening axial blind bore 102c. Rearward aluminum member 104 includes a cylindrical land portion 104a and a forwardly extending peg portion 104b. Peg portion 104b is received in bore 102c and secured therein with a press fit and/or by the use of a suitable adhesive.

Similarly, forward piston 100 includes a forward, steel member 106 and a rearward, aluminum member 108. Forward member 106 includes a frustoconical portion 106a, a forward cylindrical land portion 106b, and a peg portion 106c extending centrally and rearwardly from frustoconical portion 106a. Rear member 108 includes a cylindrical land portion 108a and a conical rearward nose portion 108b. Cylindrical land portion 108a defines a blind central bore 108c. Peg portion 106c of piston member 106 is received with a press fit in bore 108c and may further be adhesively secured within that bore. The composite piston construction shown in FIG. 3 eliminates the possibility of interference from the cylindrical land portion of the piston as the land portion approaches the magnetic sensor since the land portion, being formed of a non-ferrous aluminum material, would not affect the magnetic field and would not confuse the reading being received by the magnetic sensors as the piston moves axially in the bore to a location where the land portion approaches the sensor. Note further in FIG. 3 that the frustoconical portions 102b are arranged in reverse aspect as compared to the frustoconical portions of the construction of FIG. 1 so that the signal generated by the sensors 56, 58 gradually decreases, rather than increases, as the pistons move rightward in the bore in response to actuation of the piston assembly.

Figure 5:
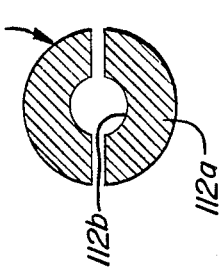
FIG. 5 is a cross-sectional view taken on line 5—5 of FIG. 4.
Figure 4:
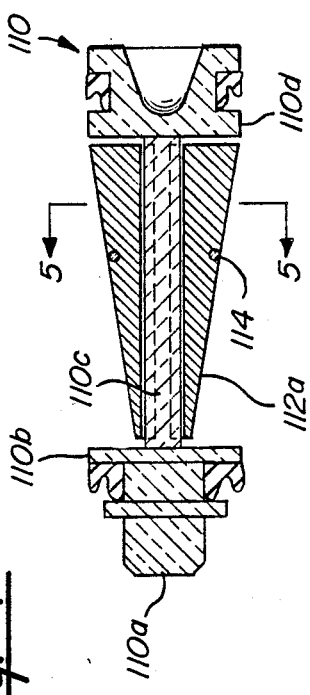
FIG. 4 is a fragmentary cross-sectional view of a further modified form of the invention.

A further form of piston assembly for use in the invention dual master cylinder assembly is shown in FIGS. 4 and 5. The piston assembly in FIGS. 4 and 5 includes a main body piston member 110 and a pair of auxiliary piston members 112. Main body piston member 110 includes a forward nose portion 110a, a forward cylindrical land portion 110b, a central axial stem portion 110c, and a rearward cylindrical land portion 110d. Main body member 110 is formed of a suitable non-ferrous material such as aluminum. Auxiliary piston members 112 are formed of a suitable ferrous material, such as a powdered ferrous metal, and each includes a conical, semi-circular outer surface 112a and a central axial groove 112b. Auxiliary members 112 are positioned on opposite sides of main body stem portion 110c with axial grooves 112b embracing the opposite sides of stem portion 110c and with the two auxiliary members 112 held in a position surrounding stem portion 110c by a garter spring 114 surrounding the auxiliary members. When thus assembled to stem 110c, the semi-circular outer surfaces 112a of members 112 combine to form a circular cross section of progressively increasing cross-sectional dimension moving from land portion 110b to land portion 110d. As in the case of the piston construction of FIG. 3, the piston construction of FIG. 4 insures that the land portions, being formed of non-ferrous materials, will not interfere with the readings generated by the magnetic sensors. Specifically, as the piston approaches a position relative to the associated sensor such that the land portion 110b moves into the conical magnetic field established by the sensor, the sensor reading will not be disturbed or confused by the non-ferrous material of land portion 110b.

The invention will be seen to provide sensing system for a dual master cylinder assembly which functions to accurately and reliably indicate any failure in either circuit of the dual master cylinder braking circuit and which functions to provide the required warning signals without violating the bore of the cylinder, thereby eliminating the expensive and complicated machining operations required with the prior art systems and further eliminating the need to provide extensive sealing with respect to the hydraulic circuitry employed to actuate the prior art sensing devices.

Whereas preferred embodiments of the invention have been illustrated and described in detail, it will be apparent that various changes may be made in the disclosed embodiments without departing from the scope or spirit of the invention.

We claim:
1. A hydraulic master cylinder assembly comprising:
    (A) a cylinder formed of a nonferrous material and defining an axial bore;
    (B) first and second pistons, each including a portion formed of a ferrous material, mounted for stroking reciprocal joint axial movement in said bore an coacting with said cylinder to define first and second pressure chambers in said cylinder;
    (C) first and second discharge ports in said cylinder communicating respectively with said first and second pressure chambers so that pressurized fluid is delivered through said first and second discharge ports in response to stroking axial movement of said pistons in said bore; and
    (D) sensing means including a magnetic sensor associated with each piston, operative to continuously sense the individual instantaneous axial positions of each piston in said bore as the pistons undergo reciprocal stroking movement in said bore and to continuously generate first and second signals respectively and continuously representing the instantaneous sensed position of said first and second pistons in said bore.

2. A master cylinder assembly according to claim 1 wherein said sensing means is further operative in response to a predetermined sensed differential movement between said pistons as said pistons move in said bore to generate a warning signal.

3. A master cylinder assembly according to claim 1 wherein:
    (E) said magnetic sensors are Hall Effect sensors.

4. A master cylinder assembly according to claim 1 wherein:
    (E) said sensing means comprises a first sensor associated with said first piston and operative to generate an electrical signal that varies in magnitude in proportion to the axial position of said first piston in said bore and a second sensor associated with said second piston and operative to generate an electrical signal that varies in magnitude in proportion to the axial position of said second piston in said bore.

5. A master cylinder assembly according to claim 4 wherein:
    (F) said sensors are operative to generate electrical signals that remain substantially identical to each other in response to substantially identical joint movement of said pistons in said bore but vary from each other in response to differential movement of said pistons in said bore; and
    (G) said sensing means is operative to generate a warning signal in response to signals from said first ans second sensors that vary from each other by a predetermined amount.

6. A master cylinder according to claim 5 wherein said sensing means further includes:
    (H) a first comparator receiving the output signal from said first and second sensors and operative to generate an output signal including an error signal representing any variations between said sensor output signals.

7. A hydraulic master cylinder assembly comprising:
    (A) a cylindrical defining an axial bore;
    (B) first and second pistons mounted for stroking reciprocal joint axial movement in said bore and coacting with said cylindrical to define first and second pressure chambers in said cylinder;

(C) first and second discharge ports in said cylinder communicating respectively with said first and second pressure chambers so that pressurized fluid is delivered through said first and second discharge ports in response to stroking axial movement of said pistons in said bore; and (D) sensing means operative to sense the individual axial positions of each piston in said bore as the pistons move linearly in said bore;

(E) said cylinder being formed of a non-ferrous material;

(F) said pistons each including a portion formed o ferrous material;

(G) said sensing means including a magnetic sensor associated with each piston;

(H) said magnetic sensors being mounted on said cylinder in axially spaced relation with each sensor adjacent said ferrous portion of a respective piston; and (I) said ferrous portion of each piston having a cross-sectional configuration that varies along the axis of said ferrous portion so that the signal generated by the respective sensor varies as the respective piston moves axially in said bore.

8. A master cylinder assembly according to claim 7 wherein:

(J) said ferrous portion of each piston has a frustoconical configuration.

9. A master cylinder assembly according to claim 8 wherein:

(K) each piston further includes first and second cylindrical land portions at the opposite ends of the frustoconical ferrous portion.

10. A master cylinder assembly according to claim 9 wherein:

(L) at least one of said land portions of each piston is formed of a non-ferrous material.

11. A master cylinder assembly according to claim 10 wherein:

(M) said ferrous portions of said pistons are formed of steel and said non-ferrous portions are formed of aluminum.

12. A hydraulic master cylinder assembly comprising:

(A) a cylinder defining an axial bore;

(B) first and second pistons mounted for stroking reciprocal joint axial movement in said bore and coacting with said cylinder to define first and second pressure chambers in said cylinder;

(C) first and second discharge ports in said cylinder communicating respectively with said first and second communicating respectively with said first and second pressure chambers so that pressurized fluid is delivered through said first and second discharge ports in response to stroking axial movement of said pistons in said bore; and (D) sensing means operative to sense the individual axial positions of each piston in said bore as the pistons move linearly in said bore;

(E) said sensing means comprising a first sensor associated with said first piston and operative to generate an electrical signal that varies in magnitude in proportion to the axial position of said first piston in said bore and a second sensor associated with said second piston and operative to generate an electrical signal that varies in magnitude in proportion to the axial position of said second piston in said bore;

(F) said sensors being operative to generate electrical signals that remain substantially identical to each other in response to substantially identical joint movement of said pistons in said bore but vary from each other in response to differential movement of said pistons in said bore;

(G) said sensing means being operative to generate a warning signal in response to signals from said first and second sensors that vary from each other by a predetermined amount;

(H) said sensing means further including a first comparator receiving the output signal from said first and second sensors and operative to generate an output signal inlcuding an error signal representing any variations between said sensor output signals, a second comparator receiving the output signal from said first comparator and operative to generate a warning output signal when the received signal exceeds a predetermined maximum threshold signal level and a third comparator and operative to generate a warning output signal when the received signal is less than a predetermined minimum threshold signal level.

13. A hydraulic master cylinder assembly comprising:

(A) a cylinder formed of a non-ferrous material and defining an axial bore;

(B) first and second pistons mounted for stroking reciprocal joint axial movement in said bore, each including a ferrous portion of varying cross-sectional configuration measured along the axis thereof, and respectively coacting with said cylinder to define first and second pressure chambers in said cylinder;

(C) first and second discharge ports in said cylinder communication respectively with said first and second pressure chambers so that pressurized fluid is delivered through said first and second discharge ports in response to stroking axial movement of said pistons in said bore;

(D) a first magnetic sensor mounted on said cylinder exteriorly of said bore proximate the ferrous portion of said first piston and operative to establish a magnetic field extending through the non-ferrous material of said cylinder and into said bore for coaction with said varying cross-sectional configuration of said first piston ferrous portion to generate a first position signal that varies with variations in the axial position of said first piston in said bore; and (E) a second magnetic sensor mounted on said cylinder exteriorly of said bore proximate the ferrous portion of said second piston and operative to establish a magnetic field extending through the non-ferrous material of said cylinder and into said bore for coaction with said varying cross-sectional configuration of said second piston ferrous portion to generate a second position signal that varies with variations in the axial position of said second piston in said bore.

14. A hydraulic master cylinder assembly according to claim 13 and further including:

(F) control means receiving said first and second pisition signals and operative in response to a predetermined difference in said position signals to generate a warning signal indicating excessive relative movement between said first and second pistons.

15. A hydraulic cylinder assembly comprising:
   (A) a cylinder formed of a non-ferrous material and having a cylinder wall defining an axial bore;
   (B) a piston mounted for reciprocal axial movement in said bore and having an axially extending portion forming the outer peripheral surface of the piston, formed of a ferrous material, and having a cross-section configuration that varies along the axis of the piston; and
   (C) a magnetic sensor mounted exteriorly of said cylinder proximate said piston portion with a portion of said cylinder wall interposed between the radially inner end of said sensor and said piston with said varying cross-section piston portion, said magnetic sensor coacting with said varying cross-section configuration of said piston portion to generate a signal that varies in relation to the linear position of said piston in said bore.

16. A hydraulic cylinder assembly according to claim 15 wherein:
   (D) said magnetic sensor is a Hall Effect sensor.

17. A hydraulic cylinder assembly according to claim 15 wherein:
   (D) said piston portion has a frustoconical configuration.

18. A hydraulic cylinder assembly according to claim 17 wherein:
   (E) said piston further includes first and second cylindrical land portions at the opposite ends of said frustoconical portion.

19. A hydraulic cylinder assembly according to claim 18 wherein:
   (F) at least one of said cylindrical land portions is formed of a non-ferrous material.

* * * * *

UNITED STATES PATENT AND TRADEMARK OFFICE
CERTIFICATE OF CORRECTION

PATENT NO. : 4,914,916

DATED : April 10, 1990

INVENTOR(S) : Keith V. Leigh-Monstevens, Brian Mabbee

It is certified that error appears in the above-identified patent and that said Letters Patent is hereby corrected as shown below:

Column 3, line 36, insert after 12b, --an end wall 12c defining a closed forward end 12d--.

Column 4, line 19, "12" should be --12L--.

Column 4, line 47, "141-001" should be --414-001--.

Column 5, line 2, "66" should be --68--.

Column 5, line 56, "guage" should be --gauge--.

Column 5, line 64, "guage" should be --gauge--.

Column 6, line 22, "decrease " should be --increases--.

Column 6, line 23, after to the right delete--so that the voltage signal generated by the sensors 56, 58 gradually increases as the pistions move to the right--

UNITED STATES PATENT AND TRADEMARK OFFICE
CERTIFICATE OF CORRECTION

PATENT NO. : 4,914,916

DATED : April 10, 1990

INVENTOR(S) : Keith V. Leigh-Monstevens, Brian Mabbee

It is certified that error appears in the above-identified patent and that said Letters Patent is hereby corrected as shown below:

IN THE CLAIMS:

Column 8, line 10, "an" should be --and--.

Column 8, line 66, "cylindrical" should be --cylinder--.

Column 10, line 66, "pisition" should be --position--.

Column 11, line 15-17, "with said varying cross-section piston portion, said magnetic sensor coacting with said varying cross section" should be --portion, said magnetic sensor coacting with said varying cross-section configuration--.

Signed and Sealed this

Thirty-first Day of December, 1991

Attest:

HARRY F. MANBECK, JR.

*Attesting Officer*   *Commissioner of Patents and Trademarks*